United States Patent [19]
Jansen

[11] Patent Number: 5,992,465
[45] Date of Patent: Nov. 30, 1999

[54] FLOW SYSTEM FOR PIPES, PIPE FITTINGS, DUCTS AND DUCTING ELEMENTS

[76] Inventor: Robert C. Jansen, 1339 Fann St., Anaheim, Calif. 92804-5538

[21] Appl. No.: 08/900,029

[22] Filed: Jul. 22, 1997

Related U.S. Application Data

[60] Provisional application No. 60/022,964, Aug. 2, 1996.

[51] Int. Cl.⁶ .................................................. F15D 55/00
[52] U.S. Cl. ................................ 138/37; 138/39; 366/337
[58] Field of Search ....................... 138/37, 39; 244/130; 366/337, 336, 338

[56] References Cited

U.S. PATENT DOCUMENTS

| | | | |
|---|---|---|---|
| 1,974,110 | 9/1934 | Higley | 138/39 |
| 5,197,509 | 3/1993 | Cheng | 137/13 |
| 5,213,138 | 5/1993 | Presz, Jr. | 138/39 |
| 5,230,369 | 7/1993 | Presz, Jr. | 138/39 |
| 5,327,940 | 7/1994 | Presz, Jr. | 138/39 |
| 5,362,179 | 11/1994 | Sirovich et al. | 138/39 X |
| 5,529,084 | 6/1996 | Mutsakis et al. | 138/39 X |
| 5,758,967 | 6/1998 | King | 138/39 X |
| 5,833,389 | 11/1998 | Sirovich et al. | 138/39 X |

*Primary Examiner*—Patrick Brinson
*Attorney, Agent, or Firm*—Stetina Brunda Garred & Brucker

[57] ABSTRACT

An insert for placement within a generally tubular fluid conduit having an inner conduit wall. The insert functions to provide quasi-laminar flow to a fluid, and is constructed as a generally ring shaped flow-through structure having an outer wall and an inner wall. The outer wall has a shape complimentary to the inner conduit wall such that the structure can be held by friction fit at an interface of the outer wall and conduit wall. The inner wall of the structure has projecting inwardly therefrom a plurality of uniformly spaced generally sinusoidal shaped vanes each terminating at an apex disposed between about 0.4 and 0.8 the radius dimension of the structure, and extending longitudinally preferably helically at an angle between about 17 degrees and 19 degrees in relation to a horizontal plane. Substantially identical construction as that of the insert is also incorporated within an inventive tubular fluid conduit having an inner wall with at least one integral quasi-laminar flow inducing portion constructed with substantially identical components as present at the inner wall of the insert. The construction functions to induce and maintain optimized spiral flow within a conduit.

23 Claims, 2 Drawing Sheets

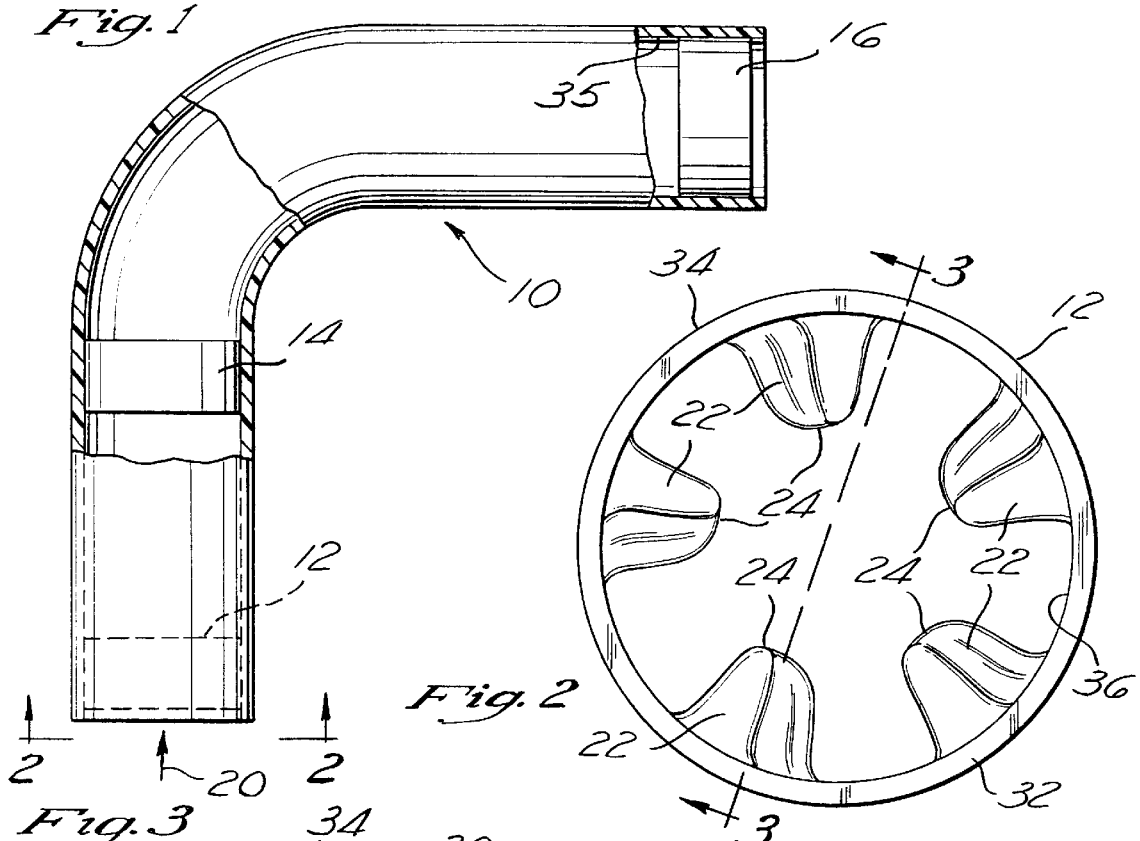

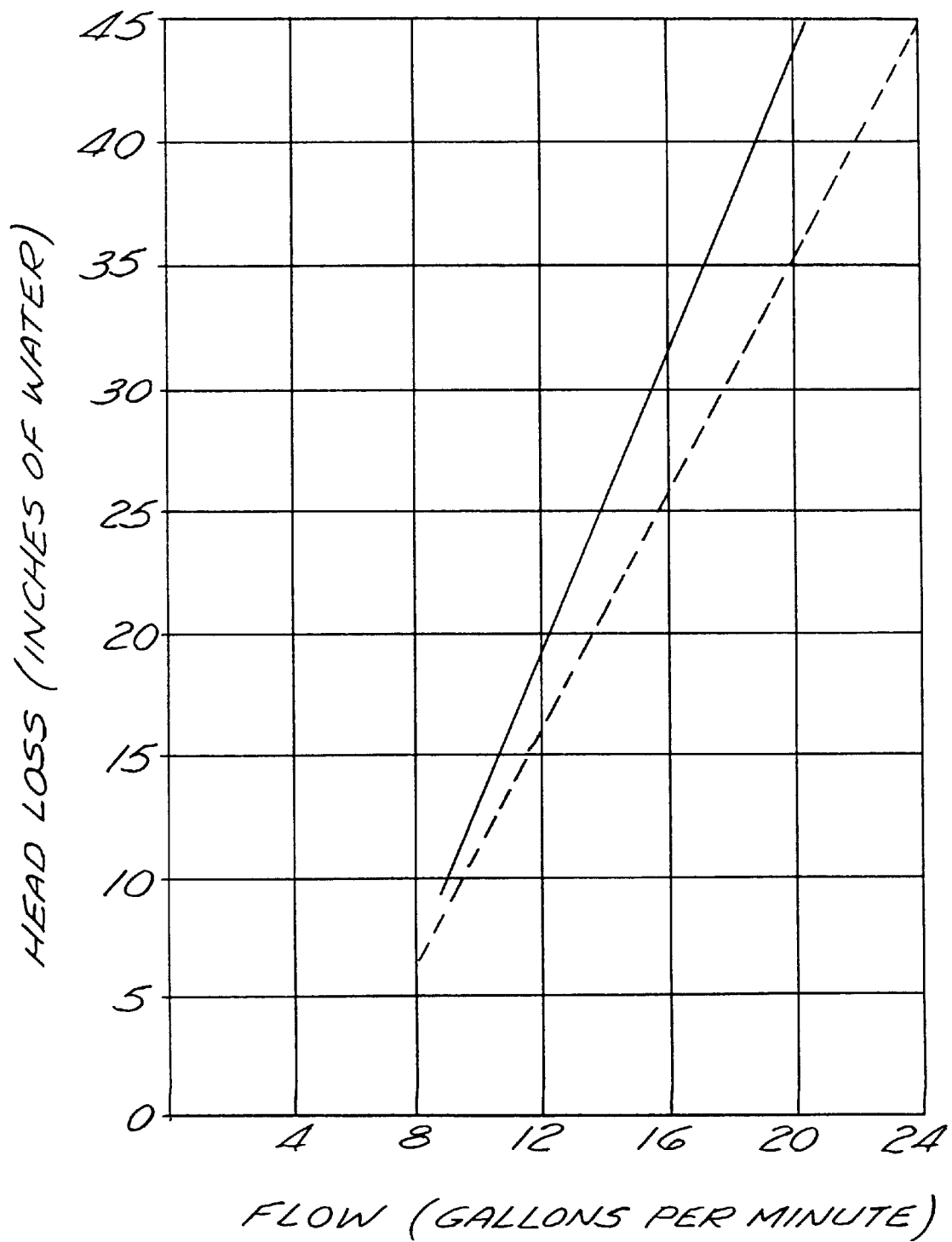

FLOW SYSTEM FOR PIPES, PIPE FITTINGS, DUCTS AND DUCTING ELEMENTS

RELATED APPLICATION

The subject application comprises a utility patent application related to provisional patent application Ser. No. 60/022,964 filed on Aug. 2, 1996 entitled LAMINAR FLOW SYSTEM FOR PIPES, PIPE FITTINGS, DUCTS AND DUCTING ELEMENTS.

FIELD OF THE INVENTION

The present invention relates in general to fluid flow, and in particular to inducing and maintaining a spiral flow pattern through provision of inwardly projecting, uniformly spaced, generally sinusoidal shaped vanes each terminating at an apex within the conduit and optionally helically shaped longitudinally within the conduit.

BACKGROUND OF THE INVENTION

The transport of fluid, whether liquid or gas, from one location to another as in an industrial manufacturing facility, for example, generally requires the employment of conduits such as piping or other ducting extending from the site of fluid storage to the site of fluid use. The route of travel of such a conduit can be a generally straight pathway or it can include one or more elbow or other turns in order to accommodate building architecture or the like present at the facility. As is well recognized in the art, however, fluid flow through a conduit is eventually impeded irrespective of travel geometry. Fluid dynamics teaches us the need for smooth flow in order to maintain efficient fluid movement, but such a flow pattern is eventually lost, and turbulent flow ensues. Once a system flow becomes turbulent, smooth flow is rarely, if ever, restored. Spiral or vortical flow solves this problem to some extent, but such a flow pattern is eventually damped out by tangential friction within the conduit, and, once again, turbulence ensues. The body of mathematics commonly known as Chaos Theory, when applied to the non-linear nature of flow, virtually guarantees the eventual collapse of any system of flow into turbulence, absent some mechanism of control.

In view of the above inefficiencies in moving a fluid from one location to another through a conduit, it is apparent that a need is present for technology that maintains an organized flow to moving fluid. One method of doing so is to induce and maintain the spiral movement described above. Accordingly, a primary object of the present invention is to provide a generally tubular fluid conduit in which sinusoidally shaped vanes therewithin define a fluid flow pattern substantially throughout the conduit.

Another object of the present invention is to provide an insert positionable within a conventional conduit whereby the insert introduces the sinusoidal shaped vane configuration to the conduit to maintain efficient fluid flow.

Yet another object of the present invention is to provide a conduit wherein at least one portion of the inside wall thereof is configured to induce and maintain a spiral movement in moving fluid.

Still another object of the present invention is to provide a conduit having curvatures such as elbows and the like wherein a portion of the inside wall immediately preceding such a curvature is configured to induce a spiral flow to fluid passing therethrough to thereby maintain a spirality of movement throughout the curvature and beyond.

These and other objects of the invention will become apparent throughout the description thereof which now follows.

SUMMARY OF THE INVENTION

The present invention is an insert for placement within a generally tubular fluid conduit having an inner conduit wall. The insert functions to provide quasi-laminar flow, here defined as a spiral or vortical flow pattern rather than a straight line pattern, to a fluid when fluid is flowing through the insert and conduit, and comprises a generally ring shaped flow-through structure having an outer wall and an inner wall. The outer wall has a shape complimentary to the inner conduit wall such that the structure can be held by friction fit at an interface of the outer wall and conduit wall. The inner wall of the structure has projecting inwardly therefrom a plurality of uniformly spaced generally sinusoidal shaped vanes each terminating at an apex disposed between about 0.4 and 0.8 the radius dimension of the structure, and extending longitudinally preferably helically at an angle between about 17 degrees and 19 degrees in relation to a horizontal plane.

Substantially identical construction for providing quasi-laminar flow as in the construction found in the insert is incorporated within an inventive tubular fluid conduit having an inner wall with at least one quasi-laminar flow inducing portion comprising a plurality of inwardly projecting uniformly spaced generally sinusoidal shaped vanes each terminating at an apex disposed between about 0.4 and 0.8 the radius dimension of the conduit. As with insert construction, each of the vanes extends longitudinally preferably helically at an angle between about 17 degrees and 19 degrees in relation to a horizontal plane.

Optimum quasi-laminar flow is achieved through provision of an insert or flow inducing portion immediately before elbows or other turns of a conduit, as well as at the entry and exit of the conduit. Depending upon the length of a straight course pathway, such inserts or flow inducing portions are provided as necessary to reduce turbulence and maintain generally quasi-laminar flow of the moving fluid as would be recognized by a skilled artisan. Thus, fluid and system characteristics of pressure, velocity and viscosity determine the number and spacing of inserts or flow inducing portions to stabilize, maintain and/or restore quasi-laminar flow of fluid. In this manner efficient spiral momentum is maintained to satisfy naturally occurring fluid dynamics phenomena and thereby accomplish efficient flow and delivery of gaseous or liquid fluid.

BRIEF DESCRIPTION OF THE DRAWINGS

An illustrative and presently preferred embodiment of the invention is shown in the accompanying drawings in which:

FIG. 1 is a side elevation view of a fluid conduit with quasi-laminar flow inducing portions therein;

FIG. 2 is a cross section view along line 2—2 of FIG. 1;

FIG. 3 is a side elevation view of a quasi-laminar flow inducing portion of a conduit as shown in FIG. 1 or a quasi-laminar flow inducing insert for placement within a conduit;

FIG. 4 is a cross section view along line 4—4 of FIG. 3; and

FIG. 5 is a graph comparing performances of certain conduits.

DETAILED DESCRIPTION OF THE PREFERRED EMBODIMENT

Referring to FIG. 1, a conduit 10 constructed of polyvinyl chloride has therein three quasi-laminar flow inducing portions 12, 14, 16. As is shown, portions 12 and 16 are disposed respectively at either end of the conduit 10, while portion 14 resides immediately before an elbow 18 in accord with the direction of flow as shown by the arrow 20. If required, one or more flow inducing portions can be included within the elbow and/or immediately after the elbow to maintain efficient fluid flow depending upon the characteristics of the transported fluid. FIGS. 1 and 2 together illustrate the configuration of the quasi-laminar flow inducing portions 12, 14, 16. While FIG. 2 shows only one portion 12 in cross section, it is to be understood that all portions 12, 14, 16 are identical in construction. Specifically, a plurality of uniformly spaced, generally sinusoidal shaped vanes 22 project inwardly, and each terminate at an apex 24 disposed between about 0.5 and 0.7, preferably about 0.618, the radius dimension of the conduit 10. The vanes 22 extend longitudinally through each portion 12, 14, 16, and, optionally, extend therethrough in a helical configuration as shown in FIGS. 2 to provide even greater enhancement of quasi-laminar flow to traveling fluid.

The conduit 10 shown in FIGS. 1 and 2 is manufactured with quasi-laminar flow inducing portions 12, 14, 16 as integral to the product. Alternatively, as shown in FIGS. 3 and 4, a flow inducing insert 30 for placement within an existing conduit such as conduit 10 of FIG. 1 can accomplish similar flow improvement. The insert 30 comprises a generally ring shaped flow-through structure 32 having an outer wall 34 and an inner wall 36. The outer wall 34 has a shape complimentary to the inner conduit wall 35 as, for example, of conduit 10 of FIG. 1 into which the insert 30 is to be placed such that the structure 32 can be held by friction fit at an interface of outer wall 34 and the conduit wall. The inner wall 36 has projecting inwardly therefrom a plurality of uniformly spaced generally sinusoidal shaped vanes 38 each terminating at an apex 40 disposed between about 0.5 and 0.7, preferably about 0.618, the radius dimension of the structure 32. As clearly shown in FIG. 3, each vane 38 is situated at an angle 28 between about 10 degrees and 25 degrees, preferably about 18 degrees, from a horizontal plane 26. A direction of flow shown by the arrow 20 in FIG. 3 will result in a counterclockwise flow of fluid. As is thus apparent, configurations of the quasi-laminar flow inducing portions 12, 14, 16 permanently a part of the conduit 10 and of the insert 30 are substantially identical to produce substantially identical impact on fluid flow.

While flow-enhancement placement at any site will produce flow improvement, and while periodic placement is recommended along the expanse of a conduit in accord with characteristics of fluid being moved through the conduit, experimentation has shown that three important positions exist for producing on-going quasi-laminar flow enhancement within a conduit. In particular, and as illustrated in FIG. 1, quasi-laminar flow initiation and/or maintenance is needed as fluid under pressure enters a conduit, immediately before or after (i.e., adjacent) fluid is subjected to a directional change, and immediately prior to the exit of fluid at its delivery site. The graph shown in FIG. 4 exemplifies typical results of water flow between a first non-modified, straight-walled conduit (solid line) and a second conduit identical to the first except for having quasi-laminar flow inducement and maintenance according to the present invention (broken line). As is apparent, pressure drop in relation to flow rate is less in the second conduit, thereby exhibiting beneficial results for quasi-laminar flow enhancement as here taught.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An insert for placement within a generally tubular fluid conduit having an inner conduit wall, said insert providing quasi-laminar flow to a fluid when said fluid is flowing through the insert and conduit, the insert comprising a generally ring shaped flow-through structure having an outer wall and an inner wall, said outer wall having a shape complimentary to the inner conduit wall such that the structure can be held by friction fit at an interface of said outer wall and said conduit wall, and an inner wall having projecting inwardly therefrom a plurality of uniformly spaced generally sinusoidal shaped vanes each terminating at an apex disposed between about 0.5 and 0.7 the radius dimension of the structure.

2. An insert as claimed in claim 1 wherein the apexes of the vanes are disposed between about 0.6 and 0.65 the radius dimension of the insert.

3. An insert as claimed in claim 2 wherein each of the vanes extends longitudinally through the insert in a helical configuration.

4. An insert as claimed in claim 3 wherein each of the vanes extends longitudinally at an angle between about 17 degrees and 19 degrees from a horizontal plane.

5. An insert as claimed in claim 4 having five vanes.

6. An insert as claimed in claim 1 wherein each of the vanes extends longitudinally through the insert in a helical configuration.

7. An insert as claimed in claim 6 wherein each of the vanes extends longitudinally at an angle between about 17 degrees and 19 degrees from a horizontal plane.

8. An insert as claimed in claim 1 having five vanes.

9. A generally tubular fluid conduit having an inner wall with at least one quasi-laminar flow inducing portion comprising a plurality of inwardly projecting uniformly spaced generally sinusoidal shaped vanes disposed around an entire tubular circumference section of said inner wall, with each vane terminating at an apex disposed between about 0.5 and 0.7 the radius dimension of the conduit.

10. A generally tubular fluid conduit as claimed in claim 9 wherein the apexes of the vanes are disposed between about 0.6 and 0.65 the radius dimension of the conduit.

11. A generally tubular fluid conduit as claimed in claim 10 wherein each of the vanes extends longitudinally through the quasi-laminar flow inducing portion in a helical configuration.

12. A generally tubular fluid conduit as claimed in claim 11 wherein each of the vanes extends longitudinally at an angle between about 17 degrees and 19 degrees from a horizontal plane.

13. A generally tubular fluid conduit as claimed in claim 9 having a first end and a second end each with a quasi-laminar flow inducing portion.

14. A generally tubular fluid conduit as claimed in claim 13 having in addition an elbow turn, said conduit having a quasi-laminar flow inducing portion disposed adjacent the elbow turn.

15. A generally tubular fluid conduit as claimed in claim 9 having in addition an elbow turn, said conduit having a quasi-laminar flow inducing portion disposed immediately before the elbow turn.

16. A method of transferring a fluid from a first site to a second site, the method comprising introducing said fluid under pressure into a conduit, said conduit having an inner wall with at least one quasi-laminar flow inducing portion comprising a plurality of inwardly projecting uniformly spaced generally sinusoidal shaped vanes disposed around an entire tubular circumference section of said inner wall, with each vane terminating at an apex disposed between about 0.5 and 0.7 the radius dimension of the conduit.

17. A method as claimed in claim 16 wherein the conduit has one quasi-laminar flow inducing portion disposed immediately after its entrance, one quasi-laminar flow inducing portion immediately before each curve, and one quasi-laminar flow inducing portion before its exit.

18. A method as claimed in claim 17 wherein in the conduit the apexes of the vanes are disposed between about 0.6 and 0.65 the radius dimension of the conduit.

19. A method as claimed in claim 18 wherein in the conduit each of the vanes extends longitudinally through respective quasi-laminar flow inducing portions in a helical configuration at an angle between about 17 degrees and 19 degrees from a horizontal plane.

20. A method of transferring a fluid from a first site to a second site, the method comprising introducing said fluid under pressure into a generally tubular fluid conduit having an inner conduit wall, said conduit having at least one insert providing quasi-laminar flow to a fluid when said fluid is flowing through the insert and conduit, the insert comprising a generally ring shaped flow-through structure having an outer wall and an inner wall, said outer wall having a shape complimentary to the inner conduit wall such that the structure can be held by friction fit at an interface of said outer wall and said conduit wall, and an inner wall having projecting inwardly therefrom a plurality of uniformly spaced generally sinusoidal shaped vanes each terminating at an apex disposed between about 0.5 and 0.7 the radius dimension of the structure.

21. A method as claimed in claim 20 wherein the conduit has one insert disposed immediately after its entrance, one insert immediately adjacent each curve, and one insert before its exit.

22. A method as claimed in claim 21 wherein in the conduit the apexes of the vanes of the inserts are disposed between about 0.6 and 0.65 the radius dimension of the insert.

23. A method as claimed in claim 22 wherein in the conduit each of the vanes extends longitudinally through respective inserts in a helical configuration at an angle between about 17 degrees and 19 degrees from a horizontal plane.

* * * * *